7531X
J. ROSS.
MACHINE FOR SHELLING CORN.
Patented Apr. 12, 1833.
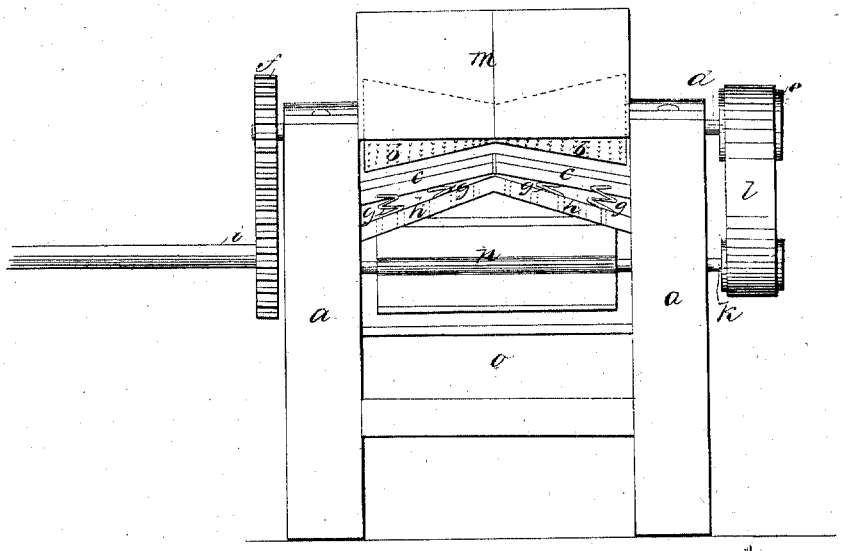
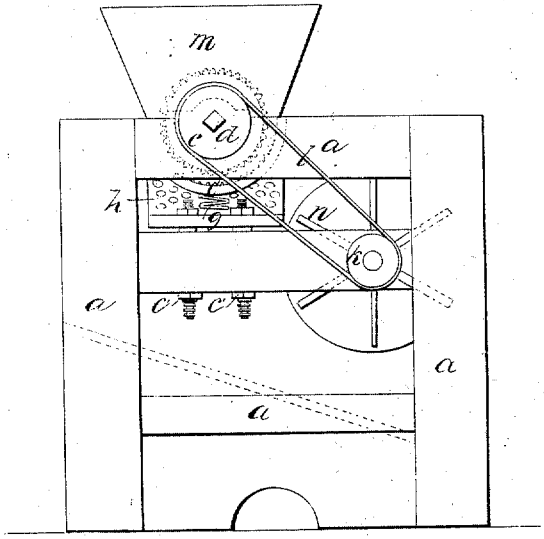
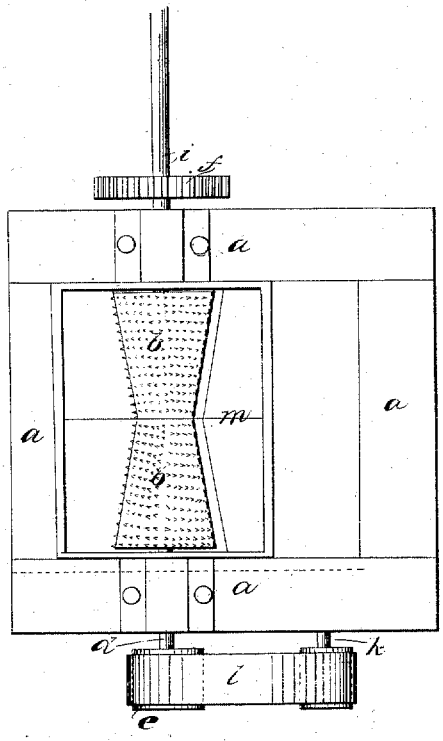

April 12. 1833 281

7531X Joseph Ross April 12, 1833

Letters Patent.

The Schedule referred to in these Letters Patent and making part of the same, containing a description in the words of the said Joseph Ross, himself, of his Improvement, in the Machine for shelling corn.

To all whom it may concern Be it known that I. Joseph Ross of Boundbrook, Somerset County New Jersey, have made an improvement in the machine for shelling corn which is described as follows.— This Machine, consists of the following principle parts viz. The frame which supports, and contains the Machinery. The two frustums of cones, covered with pins, or projections; the concave beds covered with sheet Iron, in which the cones work;— The Springs for pressing the beds towards the cones: and the gearing by which the Machinery is turned.— The frame is constructed, by mortising and tenoning together four posts, two side pieces; two end pieces;— and a frame around the top so as to produce a square, or parallelogram figure of sufficient size, to receive the several parts of the Machinery. The two frustums of cones are placed with their apices, joined in the center; and they are covered all over with pins or projections, at a proper distance apart for rubbing out the corn; They turn on an axle, supported in boxes in the frame.— this axle, is prolonged to receive a whirl, and cog wheel to be hereafter described, These frustums of cones, may be made of wood and covered with cast iron plates, having projections on them instead of pins, driven into it as before described; or it may be cast wholly of iron and projections or teeth, on its outer surface, A concave bed is placed against each cone of the same curvation as the cone, and calculated to admit of its turning freely in it. Two or more springs, are placed behind each bed, which press it against the cone. The support of these concave beds, consists of two broad pieces of timber, placed in a sloping position from the center of the machine, having

[illegible]

having a number of openings through them, to admit the grains of
corn to fall through; which pieces of timber with the concave beds
are brought nearer to, or farther from the cones by screw bolts, passing
through their ends, and the side pieces of the frame. The gearing for
turning the Machinery, is a small cogwheel, and a whirl, placed on the
same axle, with the cones. This cogwheel works into another cog-
wheel, placed on the axle of the driving power; another whirl is
placed on an axle, at the hinder end of the frame, for turning a
fanning mill; — a band passes round this whirl and that, upon the
axle of the double cone — A hopper is placed in the centre, and above the
double cone, for receiving the ears of corn — An inclined board, is
placed below the double cone, and beds, to receive the corn as it
is shelled, and to conduct it to the end of the machine, where the fan is
placed — The winnowing Machine, is made, and acts in the usual
manner — Operation: — The Hopper being filled, and the Machine put in
motion by any convenient power, the ears descend between the cones,
and beds where the grains are rubbed off, by the projections or pins —
the grain, descending down the inclined plane, to the winnowing
machine — and the cobs, flying out at the sides of the machine.
The invention here claimed, and desired to be secured by Letters
Patent consists, of the combination and arrangement of the several
parts of the before described Machine for shelling corn; but par-
ticularly the two frustums of cones, united in the centre, and armed
with teeth, or projections — No claim is made to the other parts of the
machine taken separately — For a further illustration of my inven-
tion, I refer to the model and drawing of the same deposited in the Patent
Office — In testimony whereof, I hereunto subscribe my name, this
6th day of April 1833 —

Witnesses, Joseph Ross —

Wm. P. Elliott —

Thomas N. Colbitt —

(Granted April 10th 1833.)